United States Patent Office 3,259,243
Patented July 5, 1966

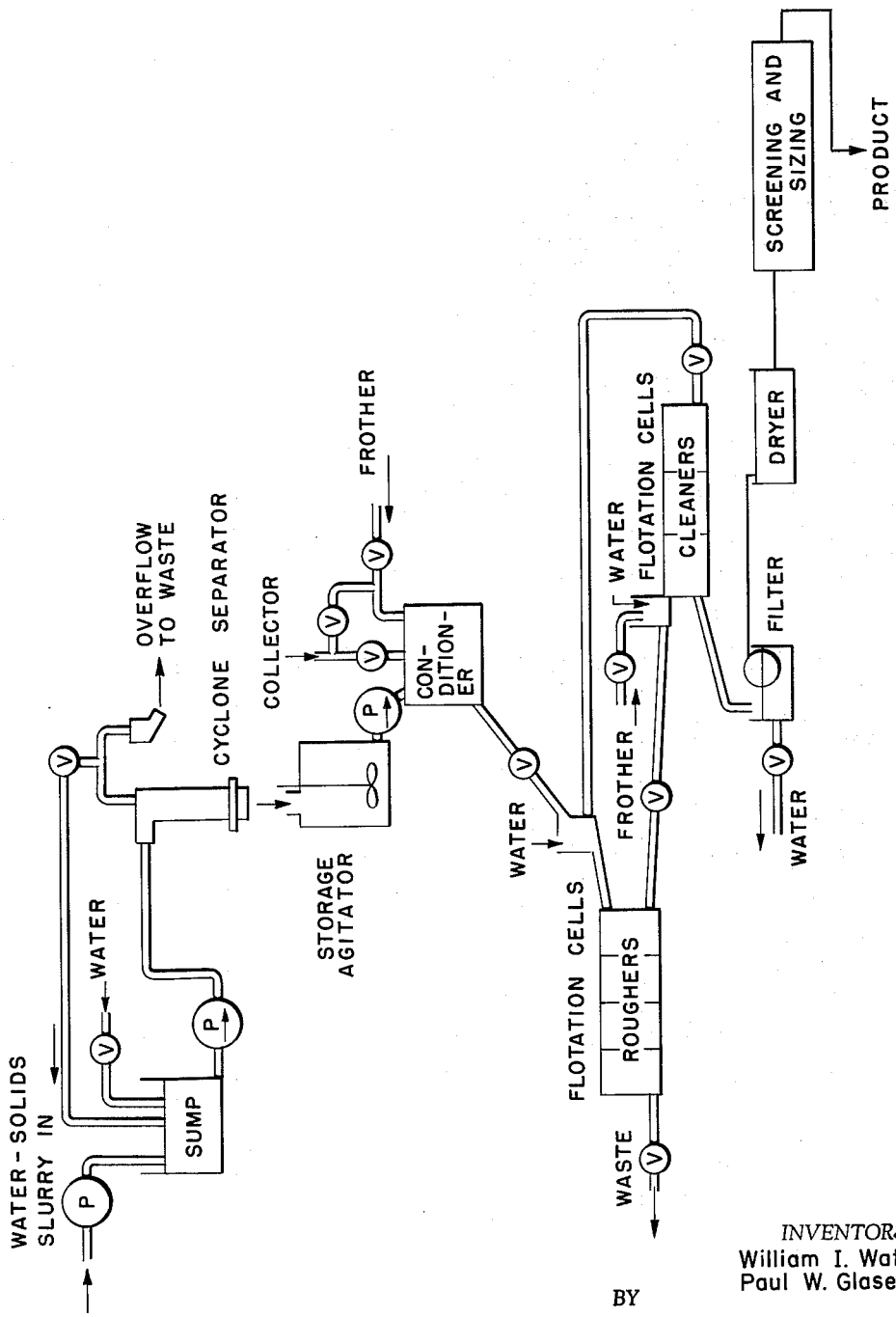

3,259,243
SILICON CARBIDE RECOVERY
William I. Watson, Berkeley, Calif., and Paul W. Glaser, Westwood, Mass., assignors to Arthur D. Little, Inc., Cambridge, Mass., a corporation of Massachusetts
Filed June 28, 1963, Ser. No. 291,483
6 Claims. (Cl. 209—166)

This invention relates to the recovery of silicon carbide from water solids slurries.

Silicon carbide is a synthetic abrasive made by heating a mixture of silica and carbon in an electric furnace using graphite electrodes. The silicon carbide thus formed is then crushed, purified and sized and the material classified in sizes ranging from 6-mesh to fine dust. Despite the fact that this material is more expensive than many other abrasives, it is preferred because of its superior abrasive properties. In the form of finely divided, relatively pure grains, which are angular in shape with sharp faces, silicon carbide is used in granular form and is also incorporated in grinding wheels, abrasive belts and papers, polishing compositions and to a lesser extent in refractories.

One of the major uses for silicon carbide abrasive particles, normally in the size range between 14-mesh and 100-mesh is in the cutting of granite. In the form of a water slurry, the silicon carbide is fed to a wire saw and in the cutting operation the silicon carbide abrades and cuts the granite (or other material) under the action of the rapidly moving wire. In this cutting process the silicon carbide particles are in turn reduced in size and are carried away in a slurry which contains, in addition to the silicon carbide, granite dust and a small amount of iron chips. The "used" silicon carbide can be physically separated and reused. The recovered material is in fact, as will be shown below, a more valuable product than the silicon carbide used in the granite cutting operation.

Because of the original cost of the silicon carbide, it would be desirable to be able to recover it efficiently and economically so that it might be used again in granite cutting and for other purposes which require smaller sized particles.

It is therefore the primary object of this invention to provide a method for recovering silicon carbide from a water slurry containing other solid materials in an efficient and effective manner. It is another object of this invention to provide such a method capable of recovering silicon carbide in finely divided form and in a manner to make it more valuable than the original silicon carbide particles used. Other objects of the invention will in part be obvious and will in part be apparent hereinafter.

The invention accordingly comprises the several steps and the relation of one or more of such steps with respect to each of the others thereof, which will be exemplified in the method hereinafter disclosed, and the scope of the invention will be indicated in the claims.

For a fuller understanding of the nature and objects of the invention reference should be had to the following detailed description taken in connection with the accompanying drawing in which:

The figure is a flow diagram of the method of this invention.

It is to be understood that the method described herein is applicable to the recovery of silicon carbide from any water solids slurry, whether or not it originates from granite cutting operations. However, for convenience of description the method will be described in terms of recovering silicon carbide particles from a water solids slurry containing granite dust and iron chips.

Turning now to the figure, the method of this invention may be described in detail. The water solids slurry from the granite cutting operation is pumped into a sump and if desired additional water is added. Typically, at this point of the process the water solids slurry will contain some 20 parts by weight of silicon carbide, 30 parts by weight of granite dust, 1 part of iron chips, and about 850 parts of water.

Inasmuch as it is necessary to remove the very fine particles which are in the range of 15 microns or smaller, the slurry from the sump is pumped into a size separator (for example a cyclone separator) where these extremely fine particles are removed as an overflow product. If desired, part of this overflow can be returned to the sump as part of the make-up water as indicated in the figure.

The method of recovering silicon carbide in accordance with this invention involves the flotation of the silicon carbide as an essential step in the recovery. It is therefore necessary to add to the water-solids slurry reagents which may be referred to as collectors and frothers. These reagents are added in a conditioner which receives the slurry from a storage agitator if storage of the slurry is required. As indicated in the figure the collector and frother may be added separately, they may be mixed before addition, or they may be added as slurries in water separately or together. The purpose of the collector is to selectively coat the material which is to be floated, in this case the silicon carbide. The selectively coated particles present to the water phase hydrophobic surfaces which have a strong attraction for air bubbles introduced into the slurry. The rising bubbles collect the coated particles as a froth on the surface. Many such collectors are known in the art and they include, but are not limited to, fuel oil, oleic acid, creosote, turpentine, kersosene or mixtures of such materials. Of these, fuel oil (for example a suitable No. 2 or No. 3), creosote and creosote fractions of oil are preferred in the practice of this invention.

It is of course, the purpose of the frother to lower the surface tension of the liquid and form the necessary bubbles. As in the case of the collectors, many of these are known in the art and they include, but are not limited to, pine oil, the alchols, and methyl isobutyl carbinol.

The amount of collector and of frother added may range from about 0.01 to 0.10 percent by weight of solids in the slurry for the former; and from about 0.005 to 0.1 percent by solids weight of the latter.

Proper attachment of the collector reagents to the mineral particles requires a 10–20 minute contact time and agitation as a heavy slurry containing preferably, about 70% solids. Solids content of this slurry may range from 60–80%. This operation of collector attachment is accomplished in the conditioner. The conditioned slurry is then transferred to roughers or first series of flotation cells. Simultaneously, sufficient water is added to reduce the solids content to about 25%, a range from about 20 to 30% being suitable. If the solids content is reduced substantially below 25%, an excessive amount of water will have to be handled. On the other hand, if the solids content is maintained substantially higher than 25% there will result an entrainment of undesirable solids in the froth formed in the flotation cells.

As shown in the figure, the diluted and conditioned slurry is transferred into a first series of flotation cells where the slurry is agitated and air, or other gas, is introduced to extend the liquid and to form the required froth which raises to the top carrying with it the conditioned silicon carbide which it contains. The tails which are waste solids from the rougher flotation cells are discarded to waste. From the rougher flotation cells the collected froth containing the silicon carbide is transferred to the cleaners or second series of flotation cells with the addition of more water and frother reagent as required. The flotation process is repeated, the froth containing the recovered silicon carbide drawn off the top, and the tails returned to the rougher flotation cells along with the water which is added to adjust the solids content.

The froth from the second flotation cell is passed over a suitable filter such as a disc filter, the water is removed, and the wet silicon carbide particles are transferred to a drier. Subsequent to the removal of the residual liquid, the dried particles are screened and sized.

Taking a water slurry which results from cutting granite as an example, the operation of the method and apparatus shown in the figure may be further described. A typical water slurry from granite cutting will contain from 3 to 3.5% solids of which about 36% is silicon carbide. With the removal of water and the extremely fine particles (those sized about 15 microns and smaller) the slurry is concentrated so that it has a solids content of about 70%, 63% of these solids being silicon carbide. At this concentration the slurry is introduced into the conditioner where the collector and frother are added. While in the conditioner the solids content of the slurry may vary widely, e.g., from about 50% by weight up to the maximum concentration which can be agitated. Normally it will range between 60–80%.

This conditioned liquid mixture is then reduced to about 25% solids content by addition of water before it enters the first rougher flotation cells for the reasons described above. This is conveniently done by adding sufficient water to the stream as it flows from the conditioner to the rougher flotation cells. The froth which is transferred to the second flotation cell is typically about 90% silicon carbide, while the solid particles which are recovered in the filter are about 95% silicon carbide. In the process about 10% of the silicon carbide present in the original slurry derived from the granite cutting operation is lost to waste.

The silicon carbide which is recovered by this method ranges in size from about 65 to 800-mesh showing an overall reduction in size from the original 36 to 60-mesh. The recovered silicon carbide may of course be screened and sized and the fine material that is that sized 100-mesh and smaller used for abrasive wheels and in fine polishing. This material is normally more valuable than the original coarser silicon carbide used in the granite cutting operation so that the recovered product is in effect worth more than the original abrasive material.

There is therefore provided by the method of this invention an effective and efficient process for recovering silicon carbide in a form which at least is partially enhanced in value.

It will thus be seen that the objects set forth above, among those apparent from the preceding description, are efficiently attained and, since certain changes may be made in carrying out the above method without departing from the scope of the invention, it is intended that all matter contained in the above description shall be interpreted as illustrative and not in a limiting sense.

We claim:
1. Method of recovering silicon carbide from a water-solids slurry, comprising the steps of
    (a) adding to a water slurry containing silicon carbide particles, granite dust and iron chips, a frothing agent and an organic collector capable of selectively coating said silicon carbide particles thereby to impart hydrophobic characteristics to their surfaces;
    (b) adding to the resulting conditioned slurry sufficient water to adjust the solids content to between 20 and 30%;
    (c) extending the resulting diluted water-solids slurry with a gas thereby to form a froth having essentially only silicon carbide particles suspended therein;
    (d) separating said froth containing said silicon carbide from the remaining liquid; and
    (e) removing said silicon carbide particles from said froth.
2. Method in accordance with claim 1 wherein said collector is fuel oil.
3. Method in accordance with claim 1 wherein said collector is creosote.
4. Method in accordance with claim 1 wherein said collector is a creosote fraction of fuel oil.
5. Method of recovering silicon carbide from a water-solids slurry, comprising the steps of
    (a) removing from a water slurry containing silicon carbide particles, granite dust and iron chips substantially all of the particulate matter sized finer than about 15 microns and forming a concentrated slurry;
    (b) adding to said concentrated slurry a frothing agent and an organic collector capable of selectively coating said silicon carbide particles thereby to impart hydrophobic characteristics to their surfaces;
    (c) adding to the resulting conditioned slurry sufficient water to reduce the solids content to between about 20 and 30%;
    (d) extending the resulting diluted water-solids slurry with a gas thereby to form froth having essentially only silicon carbide particles suspended therein;
    (e) isolating said froth; and
    (f) removing said silicon carbide particles from said froth.
6. Method in accordance with claim 5 wherein said concentrated slurry contains at least 50% solids.

References Cited by the Examiner

Flotation Fundamentals, The Dow Chemical Co., 1945 (pages 11–13).

HARRY B. THORNTON, *Primary Examiner.*

FRANK W. LUTTER, *Examiner.*

L. H. EATHERTON, *Assistant Examiner.*